(12) United States Patent
Yang et al.

(10) Patent No.: US 12,504,347 B2
(45) Date of Patent: Dec. 23, 2025

(54) DUAL AIRFOIL TESTING SYSTEM

(71) Applicant: WRIGHT STATE UNIVERSITY, Dayton, OH (US)

(72) Inventors: Zifeng Yang, Mason, OH (US); Collin Charvat, Granville, OH (US); Jack Stafford, Beavercreek, OH (US); Kyle Mathews, Dayton, OH (US); Logan Kelly, Waynesville, OH (US)

(73) Assignee: WRIGHT STATE UNIVERSITY, Dayton, OH (US)

( * ) Notice: Subject to any disclaimer, the term of this patent is extended or adjusted under 35 U.S.C. 154(b) by 298 days.

(21) Appl. No.: 18/477,192

(22) Filed: Sep. 28, 2023

(65) Prior Publication Data

US 2024/0110843 A1 Apr. 4, 2024

Related U.S. Application Data

(60) Provisional application No. 63/411,382, filed on Sep. 29, 2022.

(51) Int. Cl.
*G01M 9/04* (2006.01)
(52) U.S. Cl.
CPC ..................... *G01M 9/04* (2013.01)
(58) Field of Classification Search
None
See application file for complete search history.

(56) References Cited

U.S. PATENT DOCUMENTS

| | | | | |
|---|---|---|---|---|
| 8,359,916 B2 * | 1/2013 | Karikomi | ............. | G01M 9/062 73/147 |
| 10,794,409 B2 * | 10/2020 | McKillen | .................. | F15D 1/10 |

FOREIGN PATENT DOCUMENTS

| | | | | |
|---|---|---|---|---|
| CN | 109029903 A | * | 12/2018 | ............. G01M 9/04 |
| CN | 112729748 A | * | 4/2021 | ............. G01M 9/02 |
| CN | 114608783 A | * | 6/2022 | ............. G01M 9/04 |
| CN | 112161776 B | * | 7/2025 | ............. G01M 9/04 |

* cited by examiner

*Primary Examiner* — Peter J Macchiarolo
*Assistant Examiner* — Jermaine L Jenkins
(74) *Attorney, Agent, or Firm* — McNees Wallace & Nurick LLC

(57) ABSTRACT

A dual airfoil testing system includes a platform including a frame defining a chamber that is configured to receive a horizontal flow of air for testing a first airfoil and a second airfoil contained in the chamber and a control system including a controller to control a first attack angle stepper motor, a second attack angle stepper motor, at least one gap stepper motor, and at least one stagger stepper motor. The controller is configured to automatically control and adjust the stepper motors to control and adjust the attack angle of the first airfoil, the attack angle of the second airfoil, the gap between the first airfoil and the second airfoil, and the stagger between the first airfoil and the second airfoil.

14 Claims, 6 Drawing Sheets

DUAL AIRFOIL TESTING SYSTEM

CROSS REFERENCE TO RELATED APPLICATION

This application claims priority to U.S. Provisional Application 63/411,382, entitled "Dual Airfoil Testing System," filed Sep. 29, 2022, the disclosure being incorporated herein by reference in its entirety.

FIELD OF THE DISCLOSURE

The instant disclosure is directed to methods and devices for testing dual-airfoil systems. More specifically, the instant disclosure is directed to methods and devices for testing the performance of dual-airfoil systems in a wind tunnel.

BACKGROUND

An airfoil includes curved surfaces whose surface contour and cross-sectional shape may be designed to reduce drag and generate aerodynamic lift when moved through a fluid. Airfoils include aircraft wings, sails, wind turbine blades, helicopter blades, automotive air spoilers, fins, stabilizers, and propellers. Airfoils have four major components: a leading edge, a trailing edge, a chord, and a camber that are designed in various geometries to maximize lift tailored to the requirements of an individual system, such as, for example, an airplane wing, a helicopter propeller, or a wind turbine blade. Airfoil designs may include symmetrical or non-symmetrical configurations used to generate either laminar or turbulent flow across the airfoil surface.

Many early aircraft used dual or triplane airfoil designs for the wings, because the use of a single airfoil configuration of wood and fabric proved too unstable for the generation of sustained lift. As manufacturing capabilities increased, the use of metal single-wing monoplane designs replaced dual/tri-airfoil designs, since metal configurations increased structural integrity and the capability to generate adequate aerodynamic lift and drag reduction even though metal designs increased weight and aspect ratios. As lighter, more powerful aircraft engines capable of achieving increased flight speeds were developed, this further obviated the need to develop dual/tri-airfoil wing designs.

It may seem that dual airfoils are a thing of the past. Biplanes are often associated with World War One era aircraft and modern-day aircraft and wind turbines do not utilize a dual airfoil design. In fact, only very limited research has been done in the 21st century on the benefits of dual airfoil designs.

Recent studies, however, have shown that closely configured dual-airfoil designs may have aerodynamic advantages over single-wing configurations that could lead to enhanced fuel efficiency by the development of lower drag. For example, recent testing has shown that the lift-to-drag ratio of a biplane outperforms a thick monoplane, and the lift coefficient is higher. With the growth of global air travel, higher fuel prices, and recent initiatives to replace fossil fuels with renewable/sustainable energy sources, such as wind, a renewed interest in dual airfoils has developed.

Most modern wind turbines have three blades that are, on average, each 155 feet long, each being very expensive to produce and weighing approximately 27,000 pounds. Many issues can arise from such massive structures. Trying to transport such massive blades to a remote, hard-to-reach locations where the wind speeds are highest is challenging. Once these massive blades are in place, they produce large amounts of noise and visual pollution and can be damaged in severe storms.

With the increasing need in the modern world to shift to renewable energy and lessen reliance on fossil fuels, improving the efficiency of airfoils can greatly help this shift in many different ways. More specifically, dual-plane airfoils have mistakenly been left in the past along with their benefits. The benefits of dual airfoils may be applied to wind turbine blades to make them more efficient, as well as aircraft wings to help them burn less fuel. Further research is needed to determine the benefits of dual-airfoil configurations before these ideas come into reality.

Studying the benefits of dual airfoil designs and how dual airfoils can be implemented into wind turbine designs could minimize or obviate a lot of the previously stated issues. The Wirz Research Group at the University of California, Los Angeles, has proposed a dual blade wind turbine design that can increase the structural strength of each blade all while being 45% lighter than a conventional monoplane blade of the same length and materials. The new proposed design has also proven to create more energy than a single blade design as well as requiring less material to build. The ability to create more energy from a blade of the same length also allows for the option to shorten the length of the blades for easier transportation, and the increase in structural strength gives the blades a better chance of surviving severe storms and high winds.

Airfoil designs are conventionally tested in a wind tunnel to evaluate their performance. During these evaluations, airfoil lift, drag, airspeed, and performance are measured by mounting a model airfoil on a test stand using a range of designs and capabilities. Conventional airfoil test stand configurations are only capable of evaluating single airfoils in a range of positions and operating conditions. To perform research on dual airfoil systems, a dual-airfoil testing system with greater maneuverability and accuracy is needed. When dealing with dual-airfoil systems, the gapping, staggering, and attack angle all play a part in the lift, drag, and overall efficiency.

SUMMARY OF THE INVENTION

In some embodiments, a dual airfoil testing system comprises a platform. The platform comprises a frame defining a chamber, a first attack angle stepper motor mounted on the frame, a first mount extending from and rotatable by the first attack angle stepper motor and configured to mount a first airfoil in a first position in the chamber, a second attack angle stepper motor mounted on the frame, and a second mount extending from and rotatable by the second attack angle stepper motor and configured to mount a second airfoil in a second position in the chamber, at least one gap stepper motor mounted to the frame and configured to move the first attack angle stepper motor in a vertical direction to adjust a gap between the first airfoil and the second airfoil, at least one stagger stepper motor mounted to the frame and configured to move the second attack angle stepper motor in a horizontal direction parallel to the horizontal flow of air to adjust a stagger between the first airfoil and the second airfoil. The chamber is oriented to receive a horizontal flow of air. Actuation of the first attack angle stepper motor rotates the first airfoil on a first horizontal axis perpendicular to the horizontal flow of air to adjust a first attack angle of the first airfoil. Actuation of the second attack angle stepper motor rotates the second airfoil on a second horizontal axis perpendicular to the horizontal flow of air to adjust a second attack angle of the second airfoil. Actuation of the at least one gap stepper motor translates the first airfoil in the vertical direction to adjust the gap between the first airfoil and the second airfoil. Actuation of the at least one stagger stepper motor translates the second airfoil in the horizontal direction parallel to the horizontal flow of air to adjust the stagger between the first airfoil and the second airfoil.

In some embodiments, a method of testing a dual airfoil system comprising a first airfoil and a second airfoil comprising automatically adjusting at least one of a first attack angle of the first airfoil, a second attack angle of the second airfoil, a gap between the first airfoil and the second airfoil, and a stagger between the first airfoil and the second airfoil. The first airfoil and the second airfoil are mounted in the dual airfoil testing system.

In some embodiments, a dual airfoil testing system includes a platform including a frame defining a chamber that is configured to receive a horizontal flow of air for testing a first airfoil and a second airfoil contained in the chamber and a control system including a controller to control a first attack angle stepper motor, a second attack angle stepper motor, at least one gap stepper motor, and at least one stagger stepper motor. The first attack angle stepper motor is operably connected to a first actuating device to rotate the first airfoil. The second attack angle stepper motor is operably connected to a second actuating device to rotate the second airfoil. The at least one gap stepper motor is configured to move the first attack angle stepper motor in a vertical direction to adjust a gap between the first airfoil and the second airfoil. The at least one stagger stepper motor is configured to move the second attack angle stepper motor in a horizontal direction parallel to the horizontal flow of air to adjust a stagger between the first airfoil and the second airfoil.

DETAILED DESCRIPTION OF THE DISCLOSURE

Provided are dual airfoil testing systems and methods of testing dual airfoil systems.

Embodiments of the present disclosure, for example, in comparison to concepts failing to include one or more of the features disclosed herein, provide greater maneuverability and automation for testing dual airfoil systems, or combinations thereof.

A dual airfoil testing system evaluates the static and dynamic performance of dual airfoils as well as their aerodynamic characteristics. In some embodiments, the dual airfoils are aircraft wings. In some embodiments, the dual airfoils are wind turbine blades. The dual airfoil testing system controls the gap, stagger, and different attack angles between two airfoils by independently rotating and/or translating each airfoil by geared stepper motors to drive the system in an automated manner. In some embodiments, the upper airfoil is moveable in a vertical direction, and the lower airfoil is moveable in a forward or backward direction. In other embodiments, the upper airfoil is moveable in a horizontal direction, and the lower airfoil is moveable in a vertical direction. A control system electronically controls the stepper motors.

A dual airfoil design at an optimized positioning of the two airfoils relative to each other may be more efficient than a single airfoil design. Placing the airfoils at different gap distances, staggers, and attack angles can change efficiency. To test the effects each of these changes have on the efficiency, a dual airfoil testing system was developed for experimenting with dual airfoils in a wind tunnel. There is an interest in studying dual airfoils because of the effect that two airfoils have on lift and drag efficiency.

During use, the platform of the dual airfoil testing system is located inside a wind tunnel with the control system located outside the wind tunnel. This allows for airfoil testing to be performed without having to open the tunnel to modify the airfoil position, thereby alleviating data collection/measurement errors/disruptions. The dual airfoil testing system preferably includes three-dimensional (3D)-printed parts to manufacture/assemble individual components, which may include the platform linear rails, connections, mounting hardware, brackets, and the electronics enclosure, which may result in a smoother motion during operation, as well as improved manufacturing cost efficiencies.

In some embodiments, the 3D printing to form the 3D-printed parts is fused deposition modeling (FDM). Appropriate materials for the 3D-printed parts may include, but are not limited to, acrylonitrile butadiene styrene (ABS), polylactic acid (PLA), acrylonitrile styrene acrylate (ASA), or combinations thereof.

Figure 1:
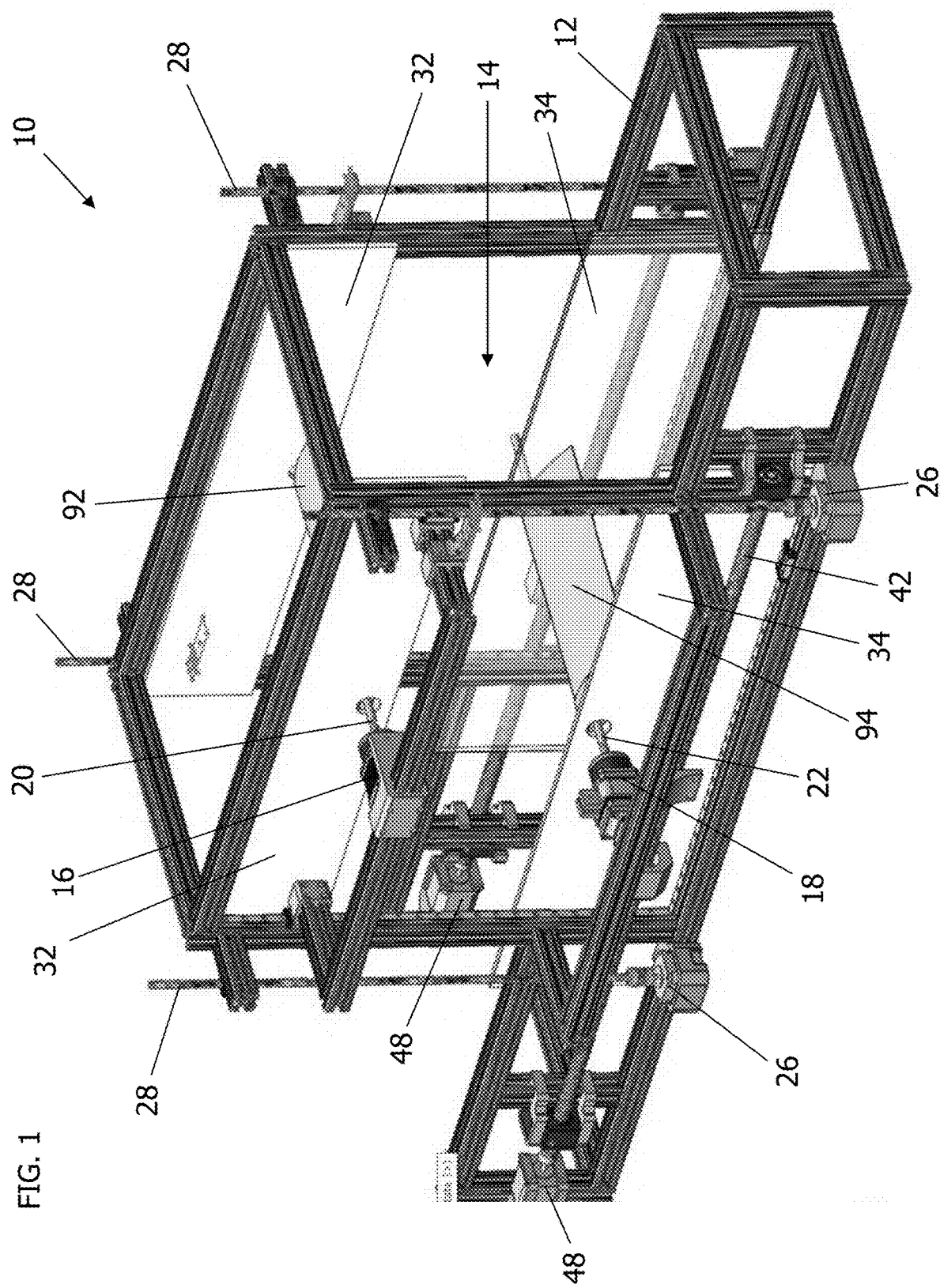
FIG. 1 schematically shows a platform of dual airfoil testing system in an embodiment of the present disclosure.

FIG. 1 shows a platform 10 of a dual airfoil testing system. The platform 10 includes a frame 12 defining a chamber 14. In some embodiments, the frame 12 is constructed from T-slot aluminum. In some embodiments, portions of the frame 12 are formed by 3D-printing. 3D-printing permits small, precise, and reliable maneuverability, which is desirable for a platform 10 of a dual airfoil testing system. The platform 10 may utilize similar parts, such as stepper motors, t-slot aluminum, and lead screws. In some embodiments, a combination of stepper motors, lead screws, pillow blocks, a ball screw, and 3D printed brackets aid in permitting movement of all of these components automatically, reliably, and accurately. In some embodiments, all motions are accomplished by the stepper motors and lead screws, which guarantees accuracy and repeatability.

In some embodiments, an upper stepper motor 16 and a lower stepper motor 18 are mounted to the frame 12. An upper mount 20 extends from the upper stepper motor 16 and through two holes in two partial upper walls 32 flanking the chamber 14 for mounting an upper airfoil 92 in the chamber 14. A lower mount 22 extends from the lower stepper motor 18 and through two holes in two partial lower walls 34 flanking the chamber 14 for mounting a lower airfoil 94. In some embodiments, the partial walls 32, 34 are made of polymethyl methacrylate.

When mounted in the chamber 14, the upper airfoil 92 is rotatable on a horizontal axis perpendicular to flow in the chamber 14 by the upper stepper motor 16, which changes the attack angle of the upper airfoil 92, and the lower airfoil 94 is rotatable on a horizontal axis perpendicular to flow in the chamber 14 by the lower stepper motor 18, which changes the attack angle of the lower airfoil 94. Each airfoil 92, 94 can be independently rotated to change the attack angle using the geared stepper motors 16, 18.

Figure 2:
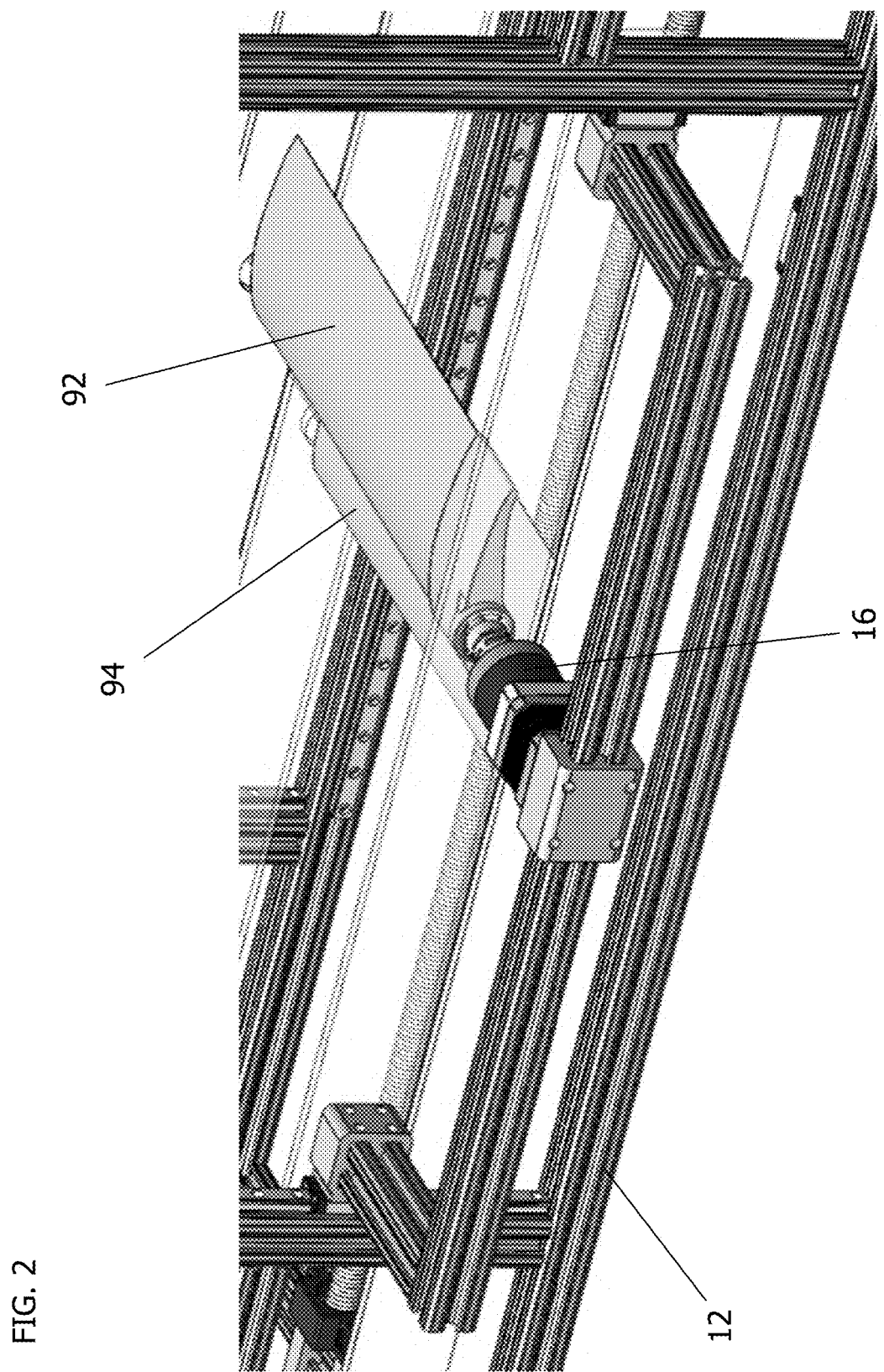
FIG. 2 schematically shows the upper airfoil mount of the platform of FIG. 1.

Geared stepper motors 16, 18 provide a high amount of holding torque, so they can hold the heavy airfoils 92, 94 in any position necessary. The attack angle stepper motors 16, 18 are mounted directly to the shafts of both airfoils 92, 94 and are then attached to more t-slot, as shown in FIG. 2.

When mounted in the chamber 14, the upper airfoil 92 is moveable vertically up or down in the chamber 14 to change the gap between the upper airfoil 92 and the lower airfoil 94. FIG. 1 shows the upper airfoil 92 in an uppermost position for a maximum gap. FIG. 2 shows the upper airfoil 92 in a lowermost position for a minimum gap. The upper attack angle stepper motor 16 and upper partial walls 32 also move up and down with the gap adjustment. To accomplish this, two 3D printed brackets mount to the vertical linear rail carriages as well as to hold an additional t-slot geometry that supports the geared stepper motor 16. A 3D printed bracket supports the t-slot to which the upper stepper motor 16 mounts.

In some embodiments, four stepper motors 26 are mounted to four vertical lead screws 28, one on each corner of the frame 12, to adjust and control the gap adjustment. The top of each lead screw 28 is mounted to a pillow block at the top of the frame 12. In some embodiments, small, two-inch pieces of t-slot are attached to each corner to allow for mounting of the pillow blocks and end stops on them.

When mounted in the chamber 14, the lower airfoil 94 is moveable forward and backward in the chamber 14, adjusting stagnation between the airfoils 92, 94. This portion of the assembly can be seen more closely in FIG. 3. In some embodiments, two large ball screws 42 placed on the bottom outside of the frame 12, are attached at each end to the T-slot frame by 3D printed brackets. These ball screws 42 control the stagger adjustment.

Figure 3:
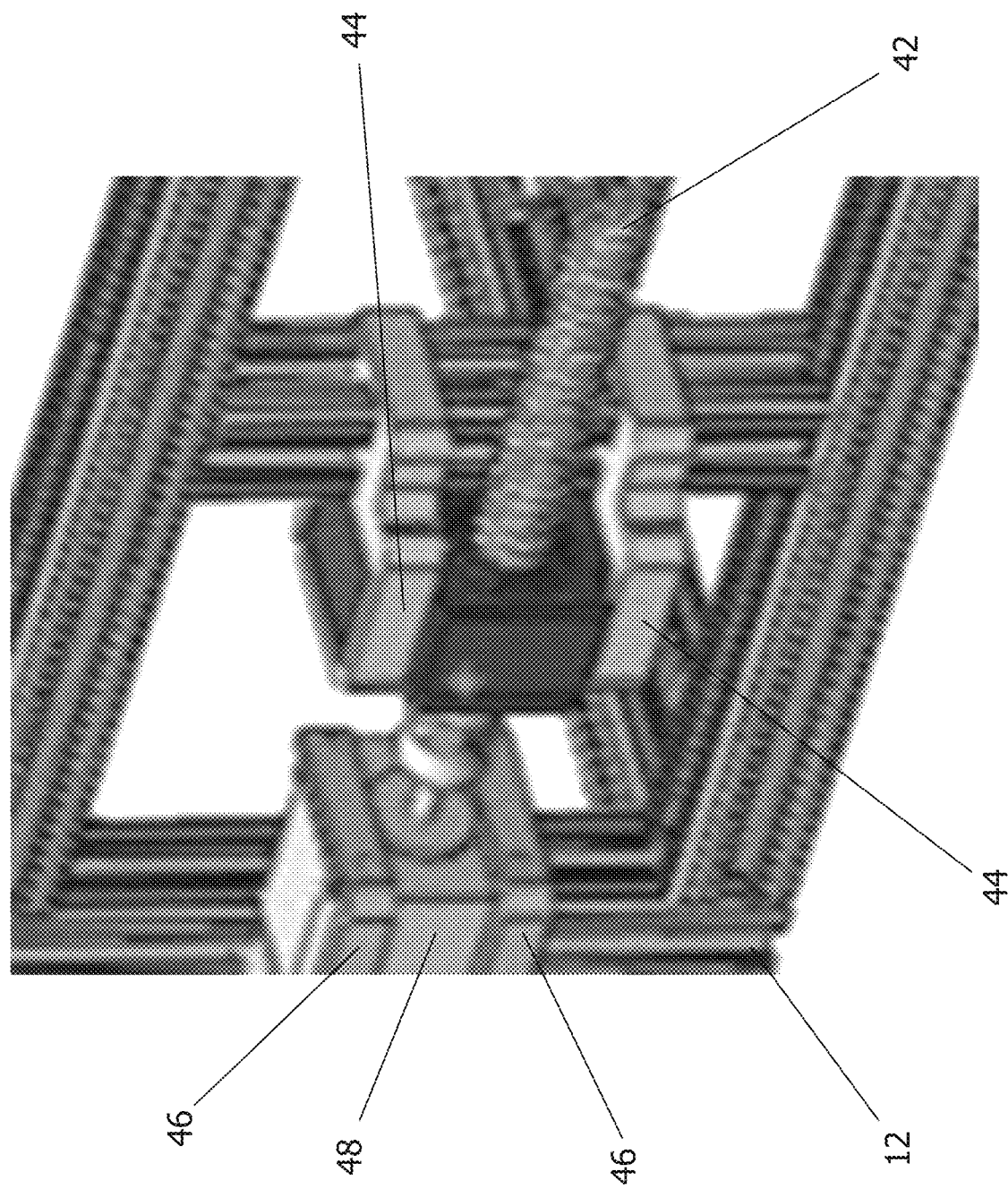
FIG. 3 schematically shows a portion of the stagnation adjustment mechanism of the platform of FIG. 1.

FIG. 3 shows a pair of 3D printed brackets 46 that hold the stepper motor 48, which drives the ball screw 10, to the frame 12 as well as a pair of 3D printed brackets 44 that hold the other end of the ball screw 42 to the frame 12. Linear rails are attached to the T-slot frame using small 3D-printed nuts paired with M3 screws.

In some embodiments, another 3D-printed bracket is designed that allows the four screws in the back of the stepper motor 16, 18, 26, 48 to be utilized to tighten the motor down to the t-slot to solidly mount the geared stepper to the t-slot. In some embodiments, the bottom airfoil 94 that moves horizontally for the stagger adjustment includes a slightly different setup for the attack angle stepper motor 18. It uses a similar 3D-printed bracket, however, this time the bracket is allowed to slide along the t-slot to move with the airfoil 94 and partial wall 34 assembly. The T-slot for the stagger attack angle stepper motor 18 does not include linear rail slider brackets for vertical actuation. Instead, the T-slot is mounted directly to the frame 12, because the bottom airfoil 94 only requires horizontal movement.

Figure 4:
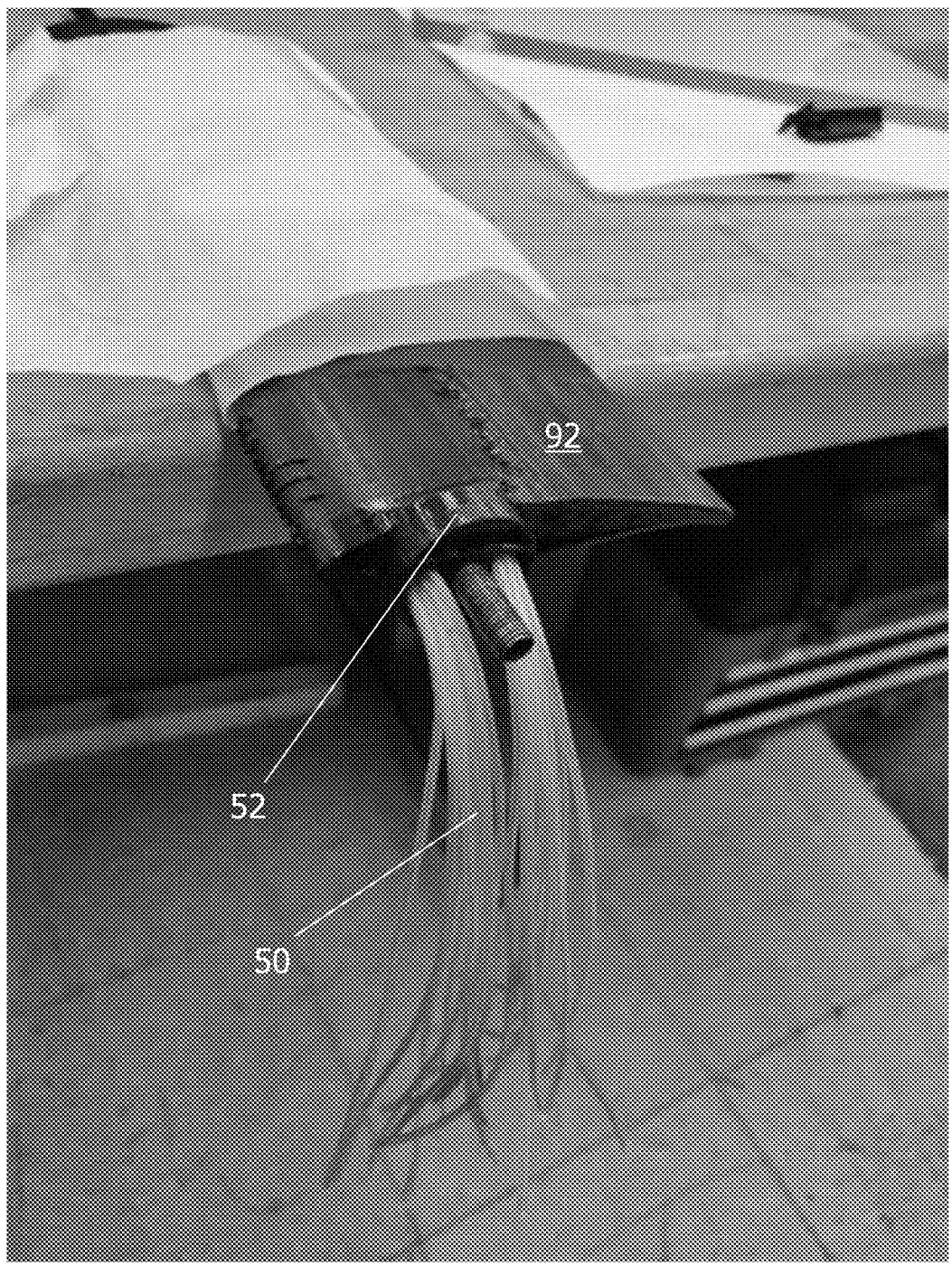
FIG. 4 schematically shows an airfoil with an extension and pressure tubes for mounting in the platform of FIG. 1.

In some embodiments, the dual airfoil testing system is capable of testing customized airfoils 92, 94. In some embodiments, collection of data by the dual airfoil system includes a pressure sensing system for measurements of pressure at various locations on the airfoils 92, 94 by a pressure sensor (not shown). To measure airfoil pressure, tiny holes may be drilled over the mid-plane surface of the airfoil 92, 94. Each hole is connected to a pressure tube of a soft tubing through the internal channel of the airfoil 92, 94. The soft tubing extends out through the hollow big bolt on one end of the airfoil. In some embodiments, multiple small pressure tubes 50 exit one side of the airfoil 92, 94, as shown in FIG. 4. As also shown in FIG. 4, an airfoil extension 52 slips over the end of the airfoil 92, 94 to contain the pressure tubes 50 and feed them through the hole in the partial wall 32, 34. In some embodiments, the airfoil extension 52 is formed by 3D printing. The airfoil extension 52 preferably slides snuggly onto the airfoil 92, 94 while leaving just enough space for all of the pressure tubes 50 to be fed through by the shaft of the airfoil 92, 94. In some embodiments, the small circular portion of the extension 52 is seated inside a small hole cut into the partial wall 32, 34, allowing for the partial wall 32, 34 to be narrower and allowing for the airfoil 92, 94 to rotate for attack angle adjustments. All of the torque applied to the airfoil 92, 94 is applied to the metal shaft of the airfoil 92, 94 to prevent the airfoil extension 52 from being subject to large amounts of force.

The pressure tubes 50 are connected to the pressure sensing system to make the pressure measurements. In some embodiments, the pressure sensing system includes an external pressure transducer, such as, for example, a DSA3217 pressure scanner (Scanivalve Corp., Liberty Lake, WA). In some embodiments, the pressure sensing system is integrated with the control system of the dual airfoil testing system. In other embodiments, the pressure readings of the pressure sensing system are collected by a separate system.

In exemplary embodiments, airflow around the airfoils is also measured. In some embodiments, the airflow measurement system includes a particle image velocimetry (PIV) system to collect airflow data. In some embodiments, the airflow measurement system is integrated with the control system of the dual airfoil testing system. In other embodiments, the airflow readings of the airflow measurement system are collected by a separate system.

The gap between the airfoils may be automatically selected and varied within a predetermined range. In some embodiments, the gap is adjustable in the range of approximately 0.5 chord lengths (c) to 2 c. In some embodiments, the chord length of the airfoils is about 100 mm. In some embodiments, the control system provides a resolution of the gap of about 0.1 mm.

The stagger between the airfoils may be automatically selected and varied within a predetermined range. In some embodiments, the stagger is adjustable in the range of approximately −2 c to 2 c. In some embodiments, the control system provides a resolution of the stagger of about 0.1 mm.

The angle of attack of the airfoils may be automatically selected and varied within a predetermined range. In some embodiments, the angle of attack range is adjustable in the approximately −5 degrees to 15 degrees. In some embodiments, the control system provides a resolution of the angle of attack of about 0.05 degrees.

Figure 5:
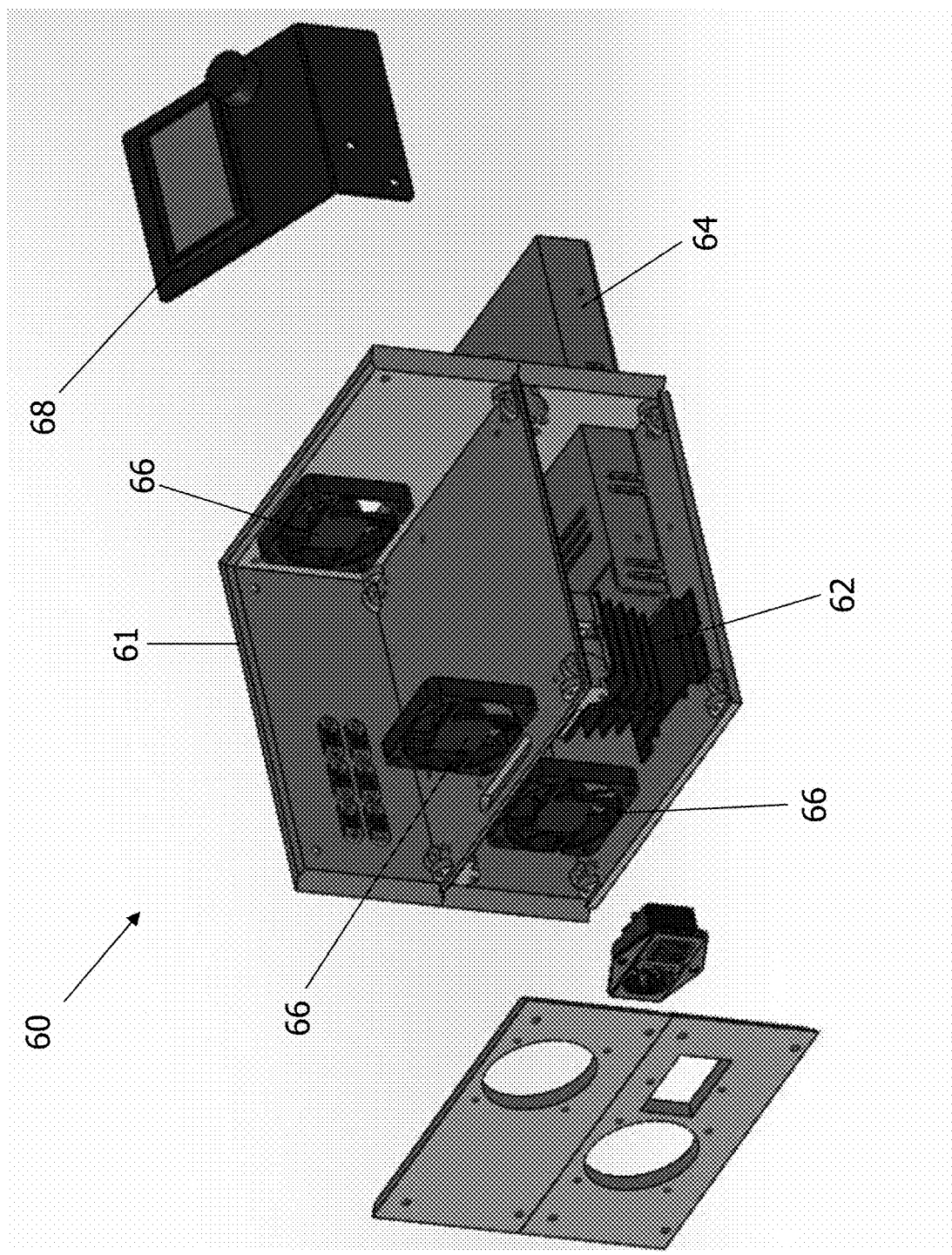
FIG. 5 schematically shows an exploded view of a control system for the dual airfoil testing system of FIG. 1.

The implementation of stepper motors 16, 18, 26, 48 to drive the system provides a capacity to control all the electronics. FIG. 5 shows an exploded view of a control system 60 for a dual airfoil testing system, including a power supply 62, a motherboard 64, cooling fans 66, and a user interface 68, and an enclosure 61 to house the electronics. In some embodiments, the user interface 68 includes a liquid-crystal display (LCD) screen that sits outside of the wind tunnel. In some embodiments, the LCD screen features a wheel/button for navigating through different menus. In some embodiments, the user interface 68 includes a computer and computer monitor. A display 70 for the user interface 68 of a computer screen or LCD screen is shown in FIG. 6.

Figure 6:
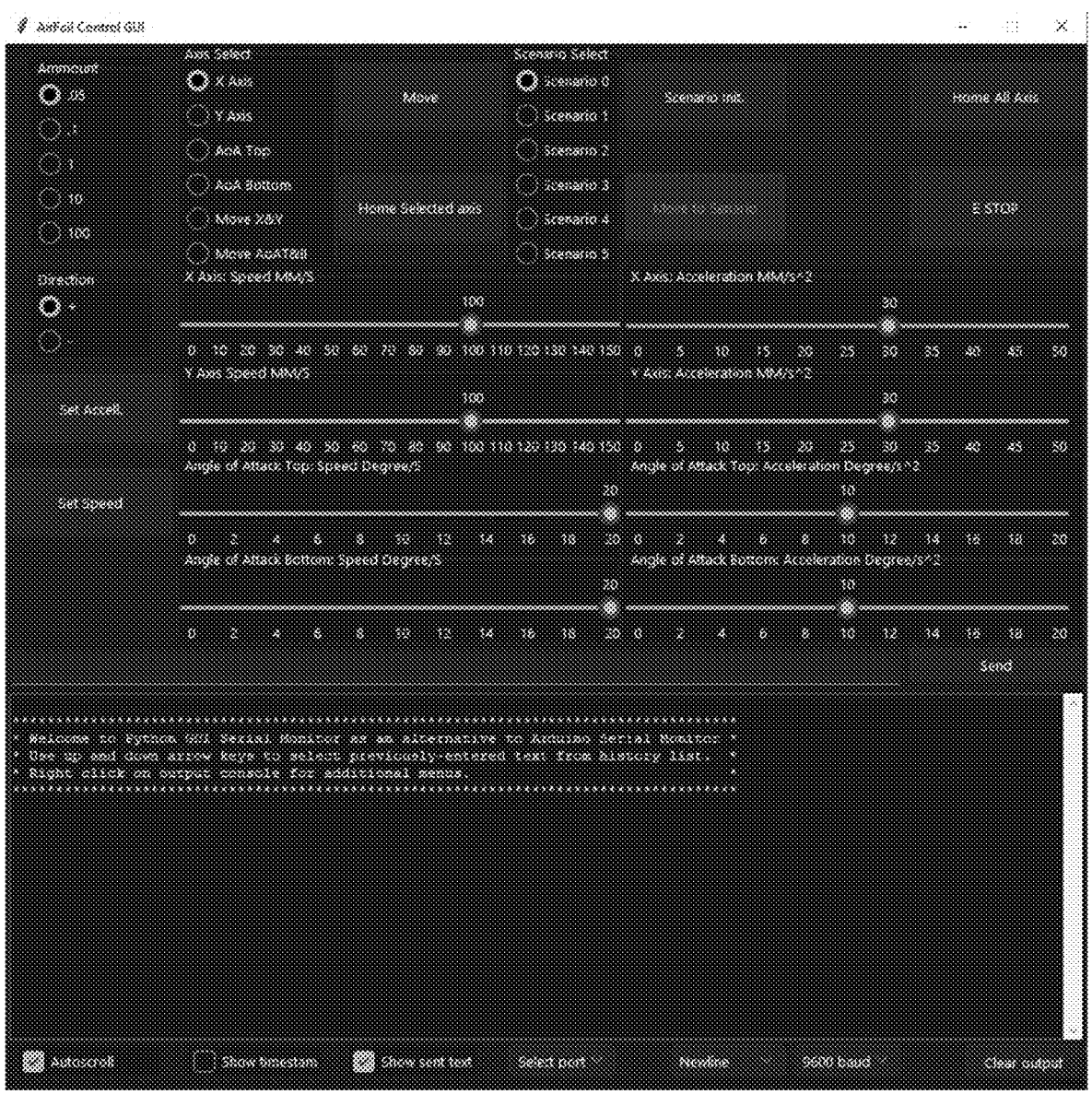
FIG. 6 schematically shows a user interface for the dual airfoil testing system of FIG. 1.

Referring to FIG. 6, features of the user interface 68 may include an ability to set the gap between the airfoils, the stagger between the airfoils, angle of attack of the first airfoil, and the angle of attack of the second airfoil, as well as the abilities to adjust the rates and ranges of change of each of these parameter within the capabilities of the stepper motors.

In some embodiments, the control system 60 includes a general motherboard 64 with stepper motor drivers integrated with a liquid crystal display (LCD) screen and user interface 68. In some embodiments, the core functions of the control system 60 are programmed in C++ code, and the code for the user interface 68 for the actual operation for users is in Python.

In some embodiments, the motherboard 64 is communicatively coupled to each of the power supply 62, the cooling fans 66, the user interface 68 and/or stepper motor drivers. In one implementation, the motherboard 64 may be a computing system that includes a processor and a storage system. The storage system includes software, which may include testing suites (i.e., measurements of pressure at various locations on the airfoils), and stored data, including data in database structure. In some implementations, the processor loads and executes software, including the testing suites, which is a software application stored in the storage system. The processor can also access data stored in the database in order to carry out the methods and control instructions described herein. Although the motherboard 64 is depicted in FIG. 5 as one, unitary system encapsulating one processor and one storage system, it should be appreciated that one or more storage systems and one or more processors, may comprise the controller, which may be a cloud computing application and system. The processor includes a processor, which may be a microprocessor, a general-purpose central processing unit, an application-specific processor, a microcontroller, or any type of logic device. The processor may also include circuitry for retrieving and executing software, including the testing suits. It should be appreciated that the processor may be implemented with a single processing device but may also be distributed across multiple processing devices or subsystems that cooperate in executing software instructions.

The storage system may comprise any storage media, or group of storage media, readable by processor, and capable of storing software and data. The storage system can include volatile and non-volatile, removable and non-removable media implemented in any method or technology for storage of information, such as computer-readable instructions, data structures, program modules, or other data. The storage system may store a set of processor instruction or algorithm, which when executed by the motherboard 64 enables automatic testing of the airfoils. Examples of the non-volatile memory may include, but are not limited to, a flash memory, a Read Only Memory (ROM), a Programmable ROM (PROM), Erasable PROM (EPROM), and Electrically EPROM (EEPROM) memory. Examples of volatile memory may include, but are not limited to, Dynamic Random Access Memory (DRAM) and Static Random-Access memory (SRAM).

The controller provides control instructions to each of the airfoils 92, 94, that is executed by the stepper motors. The control instructions may be individually configured for each airfoil 92, 94. That is, the control instructions may move the respective airfoils 92, 94, based on testing of lift and drag efficiency.

In exemplary embodiments, full automation is achieved by the control system 60, which is configured to direct the stepper motors 16, 18, 26, 48 for movement of the airfoils 92, 94 in three-dimensions: vertical movement of the upper airfoil 92 by four stepper motors 26 for gap control and adjustment, horizontal movement of the lower airfoil 94 by two stepper motors 48 for stagger control and adjustment, rotational movement of the upper airfoil 92 by an upper stepper motor 16 for upper attack angle control and adjustment, and rotational movement of the lower airfoil 94 by a lower stepper motor 18 for lower attack angle control and adjustment.

In exemplary embodiments, the motherboard 74 is configured to direct actuation of the stepper motors 16, 18, 26, 48 for movement of the airfoils 92, 94, as noted above, based upon input from a user through the user interface 68.

In some embodiments, the dual airfoil testing system includes an integrated pressure measurement capability. In exemplary embodiments, the control system collects pressure data from the pressure sensor. In some embodiments, the dual airfoil testing system includes the capability to send out a transistor-transistor logic (TTL) trigger signal to synchronize the movement of the stepper motors, and hence the airfoil, with the behavior of other measurement systems.

In some embodiments, the control system includes a capability to simulate the transformation of dual-airfoils with different rates, which enables the study of transitional aerodynamics during the transformation process.

While the disclosure has been described with reference to a preferred embodiment, it will be understood by those skilled in the art that various changes may be made, and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure is not limited to the particular embodiment disclosed as the best mode contemplated for carrying out this disclosure, but that the disclosure will include all embodiments falling within the scope of the appended claims.

Other than in any operating examples, or where otherwise indicated, all numbers expressing quantities are to be understood as being modified in all instances by the term "about," meaning within +/−5% of the indicated number.

All ranges and values disclosed herein are inclusive and combinable. For examples, any value or point described herein that falls within a range described herein can serve as a minimum or maximum value to derive a sub-range, etc. Furthermore, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc.

As used herein, the expression "at least one" is interchangeable with the expression "one or more" and thus includes individual components as well as mixtures/combinations. The terms "a" and "the" are understood to encompass the plural as well as the singular.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

What is claimed:

1. A dual airfoil testing system comprising:
a platform comprising:
a frame defining a chamber, the chamber being oriented to receive a horizontal flow of air;
a first attack angle stepper motor mounted on the frame;
a first mount extending from and rotatable by the first attack angle stepper motor and configured to mount a first airfoil in a first position in the chamber;
a second attack angle stepper motor mounted on the frame;
a second mount extending from and rotatable by the second attack angle stepper motor and configured to mount a second airfoil in a second position in the chamber;
at least one gap stepper motor mounted to the frame and configured to move the first attack angle stepper motor in a vertical direction to adjust a gap between the first airfoil and the second airfoil; and
at least one stagger stepper motor mounted to the frame and configured to move the second attack angle stepper motor in a horizontal direction parallel to the horizontal flow of air to adjust a stagger between the first airfoil and the second airfoil;
wherein actuation of the first attack angle stepper motor rotates the first airfoil on a first horizontal axis perpendicular to the horizontal flow of air to adjust a first attack angle of the first airfoil;
wherein actuation of the second attack angle stepper motor rotates the second airfoil on a second horizontal axis perpendicular to the horizontal flow of air to adjust a second attack angle of the second airfoil;
wherein actuation of the at least one gap stepper motor translates the first airfoil in the vertical direction to adjust the gap between the first airfoil and the second airfoil; and
wherein actuation of the at least one stagger stepper motor translates the second airfoil in the horizontal direction parallel to the horizontal flow of air to adjust the stagger between the first airfoil and the second airfoil.

2. The testing system of claim 1 further comprising a control system configured to actuate the first attack angle stepper motor, the second attack angle stepper motor, the at least one gap stepper motor, and the at least one stagger stepper motor to control and adjust the first attack angle of the first airfoil, the second attack angle of the second airfoil, the gap between the first airfoil and the second airfoil, and the stagger between the first airfoil and the second airfoil.

3. The testing system of claim 1 further comprising a user interface configured to receive inputs from a user for the control system to actuate the first attack angle stepper motor, the second attack angle stepper motor, the at least one gap stepper motor, and the at least one stagger stepper motor.

4. The testing system of claim 1 further comprising a pressure sensing system comprising a pressure sensor and a plurality of pressure tubes extending into the first airfoil and operatively connected to the pressure sensor for pressure measurements on the first airfoil.

5. The testing system of claim 4 further comprising an airfoil extension mountable to an end of the first airfoil proximal to the first attack angle stepper motor, wherein the airfoil extension is sized to receive the plurality of pressure tubes.

6. The testing system of claim 1, wherein the frame comprises t-slot aluminum.

7. The testing system of claim 1, wherein at least a portion of the frame is formed by three-dimensional printing.

8. A method of testing a dual airfoil system comprising a first airfoil and a second airfoil, the method comprising:
automatically adjusting at least one of a first attack angle of the first airfoil, a second attack angle of the second airfoil, a gap between the first airfoil and the second airfoil, and a stagger between the first airfoil and the second airfoil;
wherein the first airfoil and the second airfoil are mounted in the dual airfoil testing system of claim 1.

9. The method of claim 8 further comprising mounting the first airfoil and the second airfoil of the dual airfoil system in the dual airfoil testing system.

10. The method of claim 9 further comprising placing the dual airfoil testing system in a wind tunnel.

11. The method of claim 9 further comprising applying wind to the wind tunnel.

12. A dual airfoil testing system, comprising:
a platform including a frame defining a chamber that is configured to receive a horizontal flow of air for testing a first airfoil and a second airfoil contained in the chamber; and
a control system including a controller to control a first attack angle stepper motor, a second attack angle stepper motor, at least one gap stepper motor, and at least one stagger stepper motor;
wherein the first attack angle stepper motor is operably connected to a first actuating device to rotate the first airfoil;
wherein the second attack angle stepper motor is operably connected to a second actuating device to rotate the second airfoil;
wherein the at least one gap stepper motor is configured to move the first attack angle stepper motor in a vertical direction to adjust a gap between the first airfoil and the second airfoil; and
wherein the at least one stagger stepper motor is configured to move the second attack angle stepper motor in a horizontal direction parallel to the horizontal flow of air to adjust a stagger between the first airfoil and the second airfoil.

13. The dual airfoil testing system of claim 12, wherein actuation of the second attack angle stepper motor rotates the second airfoil on a second horizontal axis perpendicular to the horizontal flow of air to adjust a second attack angle of the second airfoil.

14. The dual airfoil testing system of claim 12, wherein actuation of the at least one stagger stepper motor translates the second airfoil in the horizontal direction parallel to the horizontal flow of air to adjust the stagger between the first airfoil and the second airfoil.

* * * * *